United States Patent [19]

Kurokawa

[11] Patent Number: 4,800,440
[45] Date of Patent: Jan. 24, 1989

[54] DIGITAL IMAGE SIGNAL CODING/DECODING CIRCUIT WITH BUFFER MEMORY STORING REFERENCE LINE AS COMPRESSION CODES

[75] Inventor: Hidefumi Kurokawa, Tokyo, Japan

[73] Assignee: NEC Corporation, Japan

[21] Appl. No.: 946,434

[22] Filed: Dec. 23, 1986

[30] Foreign Application Priority Data

Dec. 23, 1985 [JP] Japan .................. 60-289570

[51] Int. Cl.⁴ .................. H04N 1/413; H04N 1/41
[52] U.S. Cl. .................................... 358/260
[58] Field of Search .................. 358/260, 261

[56] References Cited

U.S. PATENT DOCUMENTS 4,396,952 8/1983 Tisue et al. ................... 358/260
4,486,784 12/1984 Abraham et al. ............. 358/261
4,622,585 11/1986 Reitsma ........................ 358/260

FOREIGN PATENT DOCUMENTS 58-151769 9/1983 Japan ........................... 358/260

Primary Examiner—James J. Groody
Assistant Examiner—Randall S. Svihla
Attorney, Agent, or Firm—Laff, Whitesel, Conte & Saret

[57] ABSTRACT

A digital signal coding/decoding circuit for coding/decoding digital scanning line signals by means of an MR coding/decoding algorithm has an MR coding/decoding circuit, a line buffer for temporarily storing information about a reference line which has been already coded or decoded, and a preparation circuit for producing compression codes from the reference line and for later expanding the compression codes into the reference line. The line buffer can be compact because it temporarily stores the compression codes rather than the reference line itself.

17 Claims, 10 Drawing Sheets

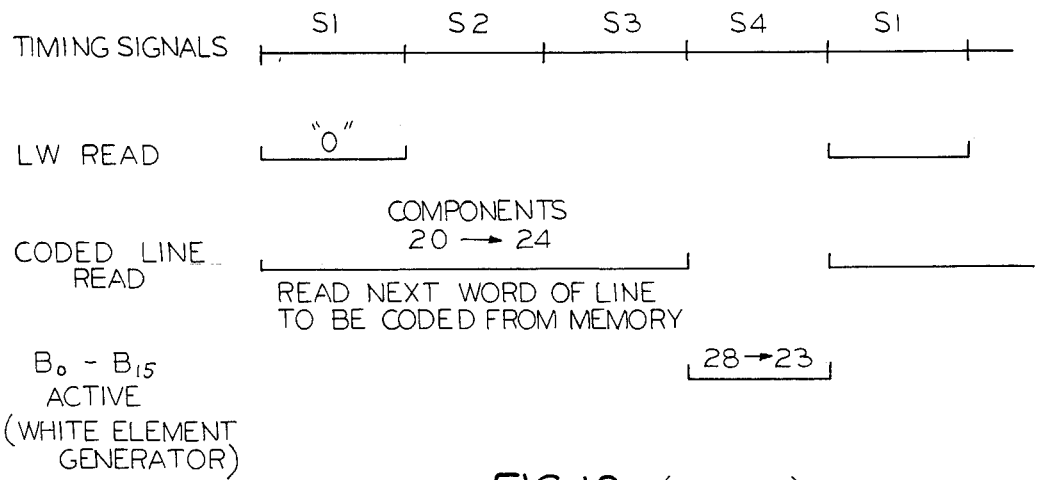
FIG. 10 (MODE A)
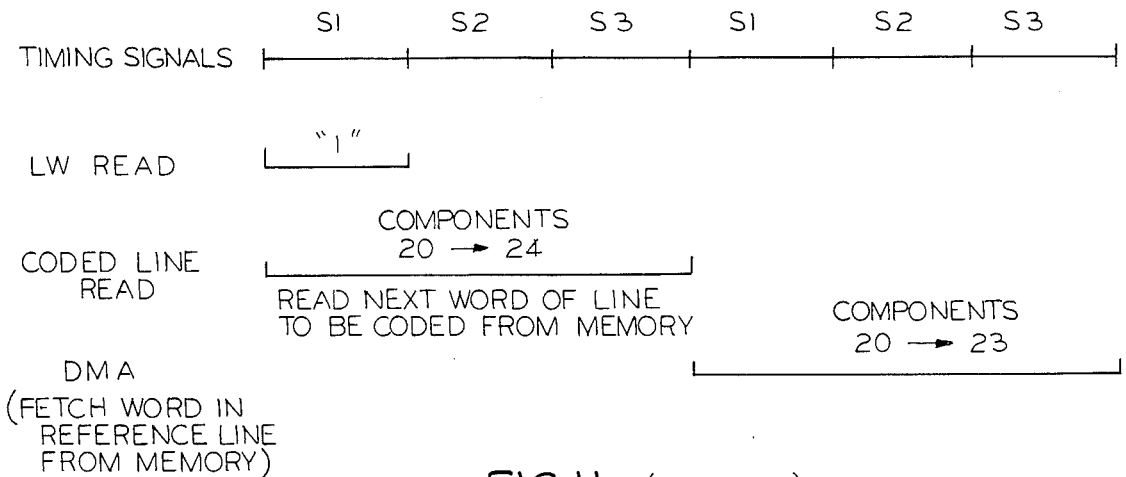
FIG. 11 (MODE B)
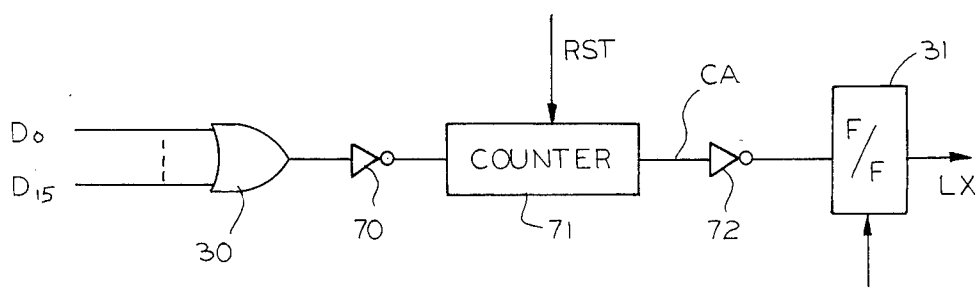
FIG. 12

DIGITAL IMAGE SIGNAL CODING/DECODING CIRCUIT WITH BUFFER MEMORY STORING REFERENCE LINE AS COMPRESSION CODES

BACKGROUND OF THE INVENTION

The present invention relates to a digital signal coding/decoding circuit and particularly to a preparation circuit for coding/decoding of a digital signal, such as a two level (white and black) facsimile signal.

Heretofore, two coding/decoding systems have been recommended by CCITT for efficient transmission of facsimile signals; one is the MH (Modified Huffman) system making 1-dimensional coding/decoding and the other is the MR (Modified Read) system with 2-dimensional coding/decoding. The latter is predominantly used because of its higher transmission efficiency. The MR coding/decoding requires a memory means for storing two adjacent scanning lines, that is, a scanning line to be coded or decoded and a previous scanning line which has been previously coded or decoded. To hold the previous scanning line, a line buffer is used for temporarily storing the previous scanning line. The stored scanning line is used as a reference line for coding or decoding a successive scanning line.

Further, if an image to be transferred is scanned with high-resolution, the amount of digital information per line increases. Therefore, a memory with a large capacity is required as the line buffer. For example, in the case of sixteen scanning signals per 1 mm, 3456 bits per one line must be coded for A4 size paper. In practical use, the reading operation of the line used as a reference line at a certain time is performed at substantially the same time as the writing into buffer operation of the next line to be used as the reference line. Two lines of buffer memory are then required in the line buffer. Therefore, a conventional coding/decoding circuit needs a line buffer with a large capacity. Consequently, it is hard to form a one-chip semiconductor integrated circuit containing the line buffer together with a coding/decoding unit.

SUMMARY OF THE INVENTION

An object of the present invention is to provide a coding/decoding circuit in which the capacity needed by the line buffer is reduced.

Another object of the present invention is to provide a coding/decoding circuit which has a lien buffer and yet can be formed on a single semiconductor chip.

A coding/decoding circuit of the present invention comprises a coding/decoding means for coding/decoding a plurality of digital scanning lines on the basis of an MR coding/decoding algorithm. A line buffer temporarily stores information about a line which has been already coded or decoded and which is used as a reference line when a successive line is coded or decoded. A compression circuit produces a compression code from the reference line. An expansion circuit expands the compression code to reproduce the reference line, when needed. The compression circuit compresses a block of digital signals into a first compression code when all of a predetermined number of digital signals are picture elements of the same color (e.g., white) and into a second compression code when the predetermined number of digital signals includes at least one picture element of a different color (e.g., black). The line buffer stores a summary of the reference line in terms of the first and second compression codes.

According to the present invention, since the buffered reference line is compressed by blocks into either the first or second codes, the line buffer needs to have only a reduced capacity, thus enabling it to be integrated on a single semiconductor chip together with the coding/decoding circuit and the line buffer control circuit.

BRIEF DESCRIPTION OF THE DRAWINGS

FIG. 10 shows a timing chart of an expansion mode A in which a compressed white code is expanded;

FIG. 11 shows a timing chart of an expansion mode B in which a compressed code including at least one black element is expanded;

FIG. 12 illustrates a circuit diagram of a compression circuit according to another embodiment of the present invention.

DESCRIPTION OF THE PRIOR ART

Figure 1:
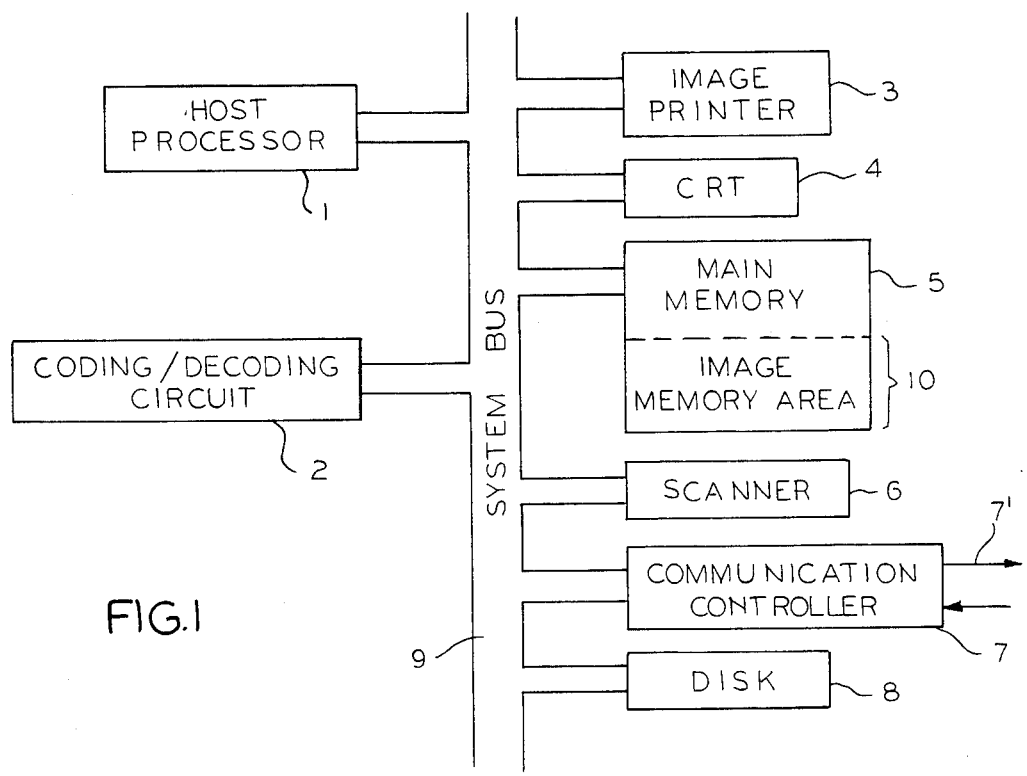
FIG. 1 illustrates a block diagram of a system to which the present invention can be applied.

A facsimile system using the present invention is illustrated in FIG. 1. The system involves a host processor 1, a coding/decoding circuit 2, an image printer 3, a CRT display device 4, a main memory 5 having an image memory area 10, a scanner 6, a communication controller 7 having a transmitter and a receiver, and a disk storage unit 8 which are coupled to each other by a system bus 9. This sytem is used as a facsimile machine and/or an image work station.

An image to be transferred is scanned by the scanner 6. If 16 scanning signals per 1 mm are used, facsimile signals of 3456 bits per line are digitized for an A4 size sheet of paper. Since there are 4752 lines on A4 size paper, 3456×4752=16,422,912 bits are necessary. In this case about 1 M words (16 bits/1 word) are assigned as the image memory area 10 of the main memory. The digitized facsimile signals are written into the image memory area 10 by the host processor 1. A large amount of these facsimile signals are compressed by MR coding. Thereafter the coded signals are transferred through a telephone line 7' under control of the communication controller 7. On the other hand, coded signals received at the communication controller 7 are decoded into original facsimile signals and are printed out by the image printer 3 or are displayed on a screen of the CRT 4. Further, the decoded facsimile signals may be recorded by the disk unit 8. To code or decode the facsimile signals, the coding/decoding circuit 2 is employed.

Figure 2:
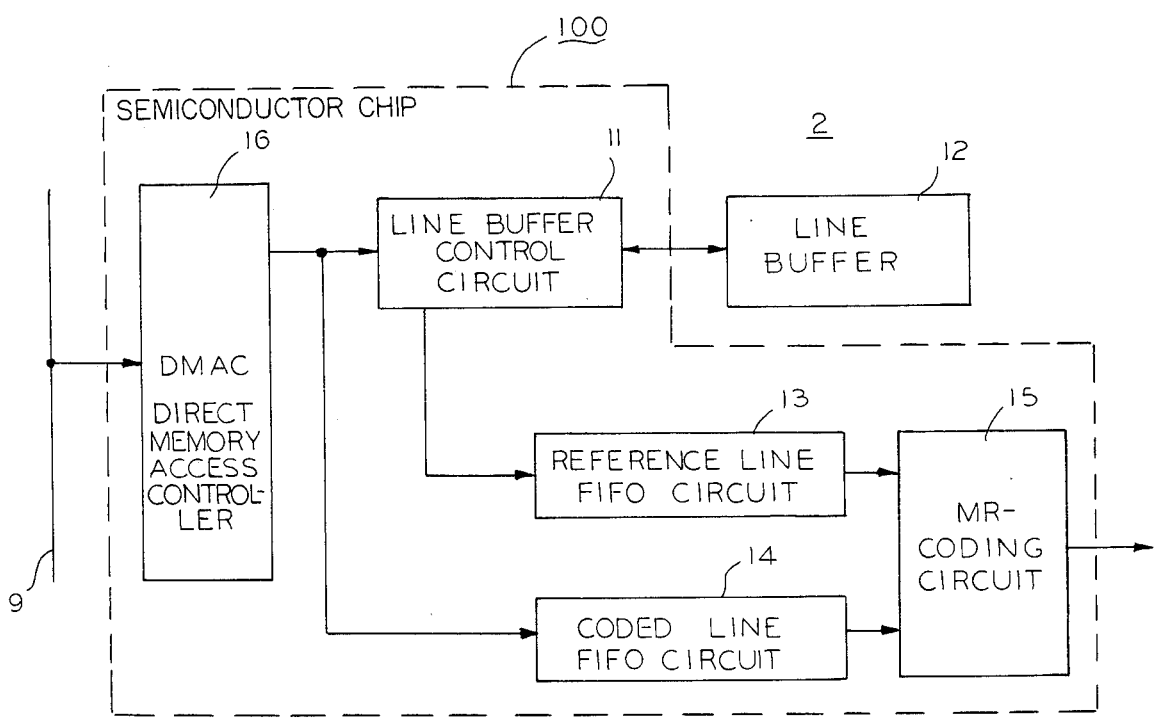
FIG. 2 illustrates an internal block diagram of a prior art coding circuit.

FIG. 2 illustrates an internal block diagram of the conventional coding circuit which includes a well-known MR coding circuit 15. The MR coding circuit 15 is a two-dimensional coding circuit. The present invention relates to a preparation circuit for the MR coding, so that a detailed explanation with respect to the MR coding circuit will be omitted. In order to code the facsimile signals stored in the image memory area 10 according to an MR coding algorithm, an adjacent two lines are necessary as described hereinbefore. A line to be coded is transferred word by word via a coded line FIFO (First-In-First-Out) circuit 14 to the MR coding circuit 15, while a reference line is transferred word by word via a reference line FIFO circuit 13 to the MR coding circuit 15. These two lines are read out from the image memory area 10 of the main memory 5. If the reading operation of these two lines is performed by the host processor 1, the workload of the host processor 1 is increased. To avoid burdening the host processor, a direct memory access controller (DMAC) 16 is employed. The DMAC 16 is coupled to the system bus 9 and applies addresses according to a predetermined order to the main memory 5 to read out each line therefrom. The line so read out from memory is transferred to the MR coding circuit 15 by means of DMA (direct memory access) transfer. Since two adjacent line are necessary to code one line, the DMA transfer must be performed twice to code one line. Therefore, when N lines are coded, 2 x N times of DMA transfer must be performed.

To reduce the number of DMA transfers, a line buffering technology has been proposed. The line buffering technology is based on the fact that a line to be coded now will be used as a reference line when a successive line is coded. According to the prior art coding circuit employing line buffering technology, as shown in FIG. 2, DMAC 16 enters a line to be coded. That line is read out of the image memory area 10 into the coded line FIFO circuit. Simultaneously, DMAC 16 enters the same line into a line buffer control circuit 11. The line buffer control circuit 11 has a first address circuit for generating a write-address at which the line to be coded is written and a second address circuit for generating a read-address from which the line is read out.

The line buffer control circuit 11 applies the line transferred from the DMAC 16 to a line buffer 12 together with the write address. The line buffer 12 temporarily stores the line applied from the line buffer control circuit. When a subsequent line to be coded is entered into the coded line FIFO circuit 14 by DMAC 16, the stored line is read out of the line buffer 12 according to the read address and is entered into the reference line FIFO circuit 13.

As described above, in the conventional buffered coding circuit, the binary information representing each line is stored as is in the line buffer 12, so that the buffer 12 must have a large memory capacity (3456 bits×2 lines in the case of A4 size paper scanned by sixteen scanning signals per 1 mm). Consequently, it is difficult to integrate such a large line buffer 12 on a single semiconductor chip 100 along with the two FIFO circuits 13 and 14, the MR coding circuit 15, and the DMAC 16.

DESCRIPTION OF THE PREFERRED EMBODIMENTS

Figure 3:
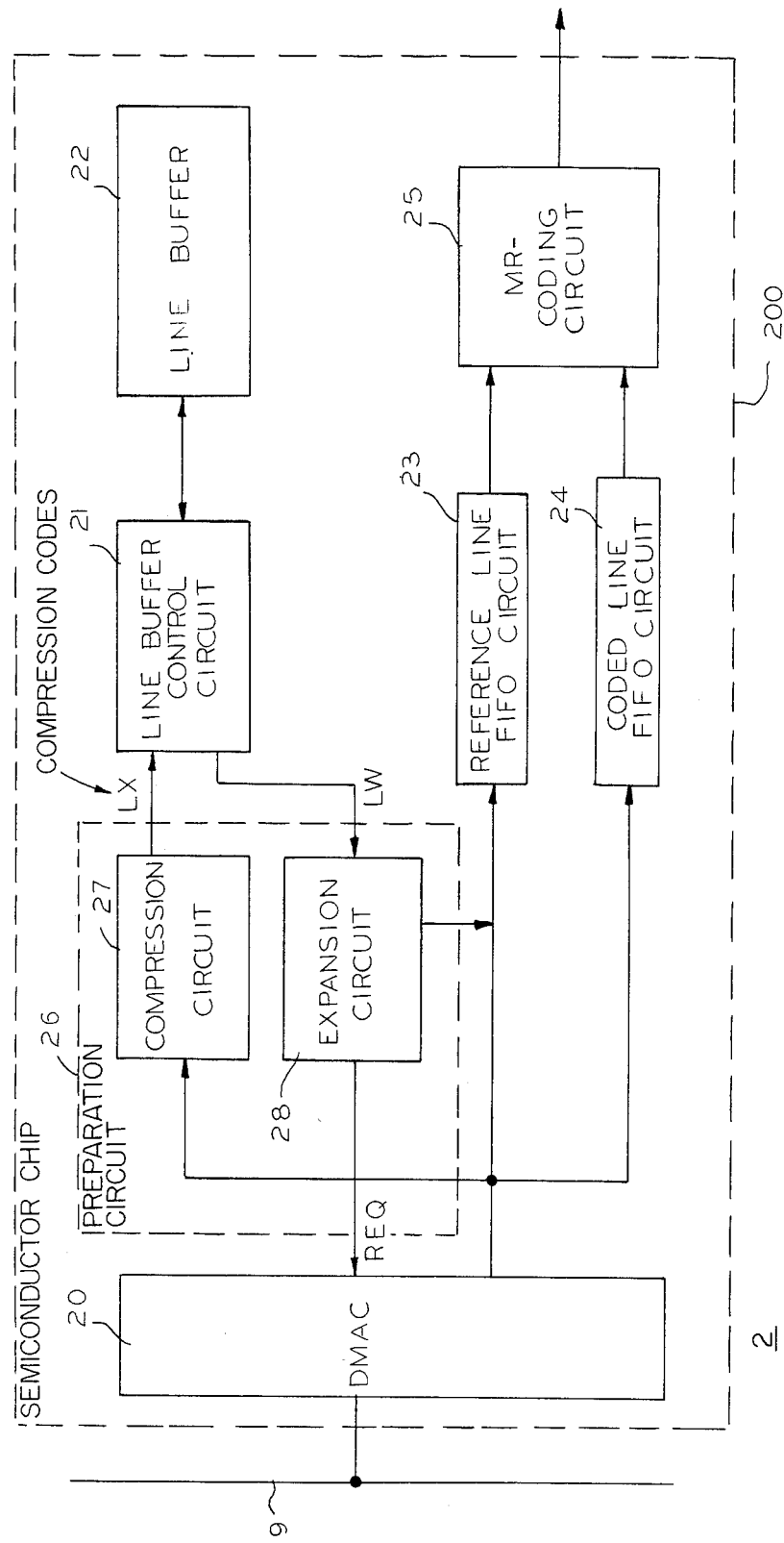
FIG. 3 illustrates an internal block diagram of a coding circuit according to an embodiment of the present invention.

Referring to FIG. 3, an embodiment of the present invention with respect to a coding circuit will be described. The coding circuit, employing the MR coding algorithm, shown in FIG. 3 comprises a direct memory access controller (DMAC) 20, a line buffer control circuit 21, a line buffer 22, a reference line FIFO circuit 23, a coded line FIFO circuit 24, an MR coding circuit 25 and a preparation circuit 26. The feature of the present invention is in the preparation circuit 26, which has a compression circuit 27 and an expansion circuit 28. By adding the preparation circuit 26, the DMAC 20 and the line buffer control circuit 21 are slightly modified as described. hereinafter. However, the reference line FIFO circuit 23, the coded line FIFO circuit 24 and the MR coding circuit 25 may be the same as those in FIG. 2. With respect to the line buffer 22, its capacity can be remarkably reduced.

As shown in FIG. 3, the DMAC 20 is coupled to the system bus 9 for access to the main memory 5 in FIG. 1 and is coupled in common to the reference line FIFO circuit 23, the coded line FIFO circuit 24, and the preparation circuit 26. When the compression circuit 27 receives a line to be coded (which line is also entered into the coded line FIFO circuit 24), it compresses the line into a short code (hereinafter called "compression code") LX. The compression code LX is written into the line buffer 22 via the line buffer control circuit 21. A compression code stored in the line buffer 22 is read out and sent to the expansion circuit 28 as a reference code LW by the line buffer control circuit 21. The expansion circuit 28 expands the reference code LW to reproduce the original uncompressed line by using the DMAC 20. The reproduced line is entered as a reference line into the reference line FIFO circuit 23 when a successive line is entered into the coded line FIFO circuit 24. The two adjacent lines in circuits 23 and 24 are applied to the MR coding circuit 25. Using the MR coding algorithm, the MR coding circuit 25 produces a coded signal of the line in the coded line FIFO circuit 24 with reference to the reference line in the reference line FIFO circuit 23.

The DMAC can access the image memory area 10 of the main memory 5 word by word. When one word is comprised of sixteen bits (dots), the DMAC 20 simultaneously reads sixteen bits out of the image memory area 10 and enters them into both the compression circuit 27 and the coded line FIFO circuit 24 at the same time. The compression circuit 27 compresses the read out sixteen bits into just one bit (compression code). That is, if the sixteen bits represent a string of all white picture elements, "0" is generated as the compression code. On the other hand, if the string is sixteen bits includes at least one black picture element, "1" is generated as the compression code. Thus, the compression circuit 27 compresses sixteen bits into one bit. The compressed code is written into the line buffer 22. Consequently, the capacity of the line buffer 22 can be reduced to one-sixteenth of the line buffer in prior systems. In the case of using sixteen scanning signals per 1 mm, for an image of A4 size paper (3456 bits/line) the memory capacity required by the line buffer 22 is only 216 bits. As a result, the line buffer 22 can be integrated on a single semiconductor chip 200 together with the DMAC 20, the preparation circuit 26, and FIFO circuits 23 and 24.

Figure 4:
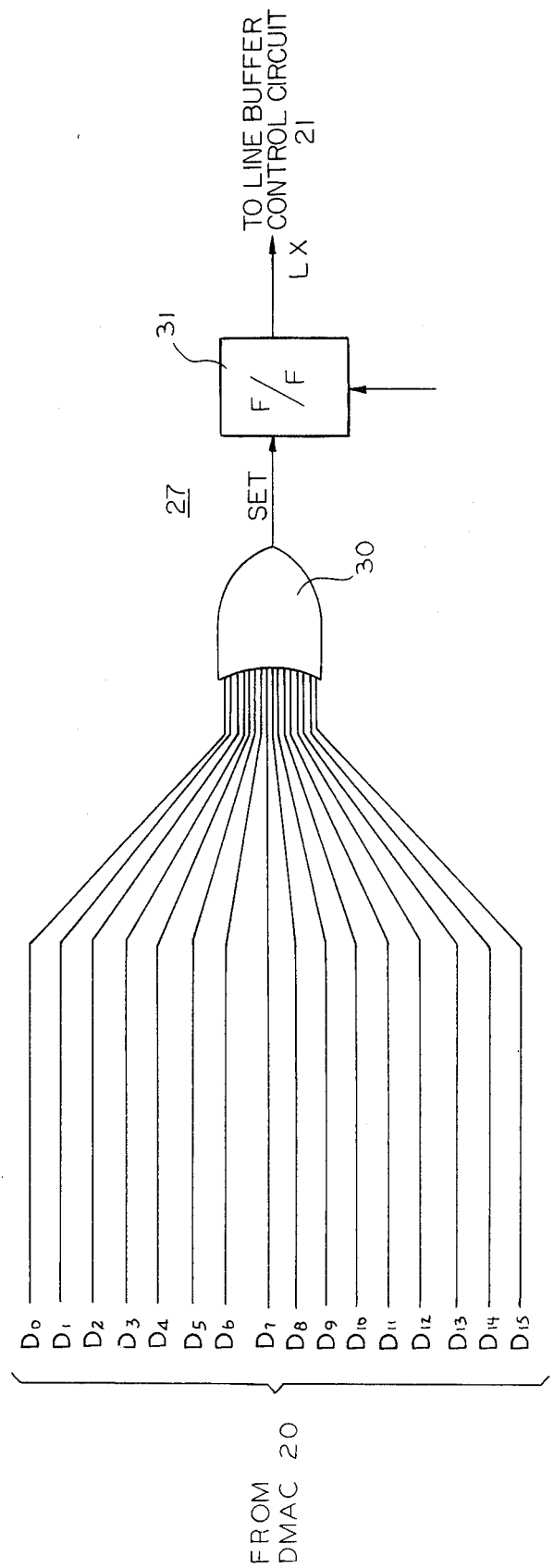
FIG. 4 illustrates a circuit diagram of a compression circuit for detecting a black picture element.

An example of the compression circuit 27 is illustrated in FIG. 4. The illustrated compression circuit comprises an OR gate 30 having its sixteen input ends coupled to the DMAC 20 to receive sixteen bits $D_0$–$D_{15}$ in parallel, and a flip-flop 31 having its set input coupled to an output of the OR gate 30. It is assumed that a white picture element is represented by "0" and that a black picture element is represented by "1". When the sixteen bits of $D_0$–$D_{15}$ are all white picture elements, the output of the OR gate 30 becomes "0". The flip-flop 31 is also set to "0" and outputs a "0" signal as the compression code LX. On the other hand, when at least one black picture element is involved within the sixteen bits $D_0$–$D_{15}$, the output of the OR gate 30 becomes "1", and therefore the flip-flop 31 is set to "1". At this time, a "1" signal is output as the compression code LX. Thus, sixteen bits can be compressed into a 1-bit code of "0" or "1". The compression code is written into the line buffer 22 via the line buffer control circuit 21.

The code written into the line buffer 22 must be used as the reference line when a subsequent line is coded. However, because the reference line is written into the line buffer 22 in the form of compression code, the reference code LW read out of the line buffer 22 cannot be directly entered into the reference line FIFO circuit 23 as is. Therefore, the expansion circuit 28 is provided to expand and restore the compression code into the original sixteen-bit signals existing before compression.

Figure 5:
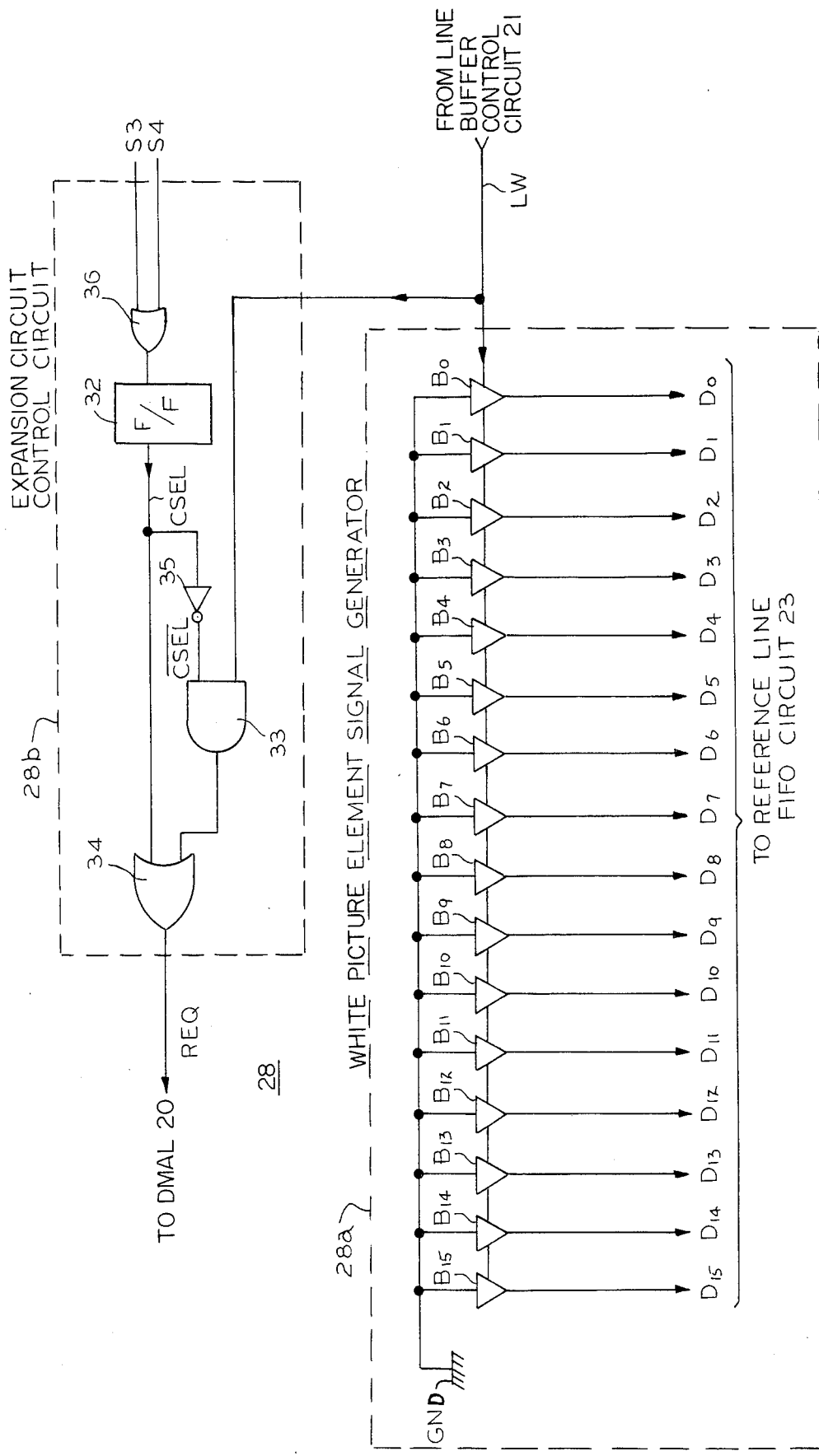
FIG. 5 illustrates a circuit diagram of an expansion circuit for producing white picture element information.

FIG. 5 illustrates a circuit diagram of an example of the expansion circuit 28. The expansion circuit has a white picture element signal generator 28a. In this embodiment, sixteen-bit white signals ("0" signals) are generated according to the compressed reference code LW read out of the line buffer 22. As shown in FIG. 5, sixteen buffers $B_0$–$B_{15}$ are arranged in parallel. An input end of each buffer is connected to ground (GND) in common. The compression code LW read out of the line buffer 22 is applied in common to each of the sixteen buffers $B_0$–$B_{15}$. When the compression code LW is "0" (low level signal), the buffers $B_0$–$B_{15}$ are activated simultaneously, generating sixteen "0" signals $D_0$–$D_{15}$ at the same time. These "0" signals, representing sixteen bits of white picture elements, are transferred to the reference line FIFO circuit 23. That is, when the code LW is "0", the sixteen bits entered by expansion circuit 28 into the reference line FIFO circuit 23 are all white ("0") signals.

On the other hand, when the compressed code LW is "1", all the buffers $B_0$–$B_{15}$ are inactivated, making all of their outputs $D_0$–$D_{15}$ a high impedance to enable other information including at least one black picture element to be entered in the reference line FIFO circuit 23. The expansion circuit 28 has a control circuit 28b comprising OR gates 34 and 36, and AND gate 33, an inverter 35 and a T type (bistable) flip-flop 32. As inputs, the control circuit receives timing signals S3 and S4 and the compression code LW read out of the line buffer 22. It produces a (memory read) request signal REQ to DMAC 20 when the code LW is "1". The request signal REQ is applied to the DMAC 20 to indicate that the previous line which has been already coded by coding circuit 25 is required as the reference line for circuit 23. The DMAC 20 reads the previous line stored in the image memory area 10 out of the main memory 5 by means of DMA transfer, only when the code LW is "1". In such case, the previous line including at least one black picture element is entered into the reference line FIFO circuit 23. The REQ signal is generated either when a CSEL signal from flip-flop 32 is a 1", or when both a $\overline{CSEL}$ signal (the logical inverse of the CSEL signal) and the code LW are "1". The CSEL signal is an output signal of the flip-flop 32, whose state is reversed whenever either of the timing signals S3 or S4 becomes a "1".

Figure 6:
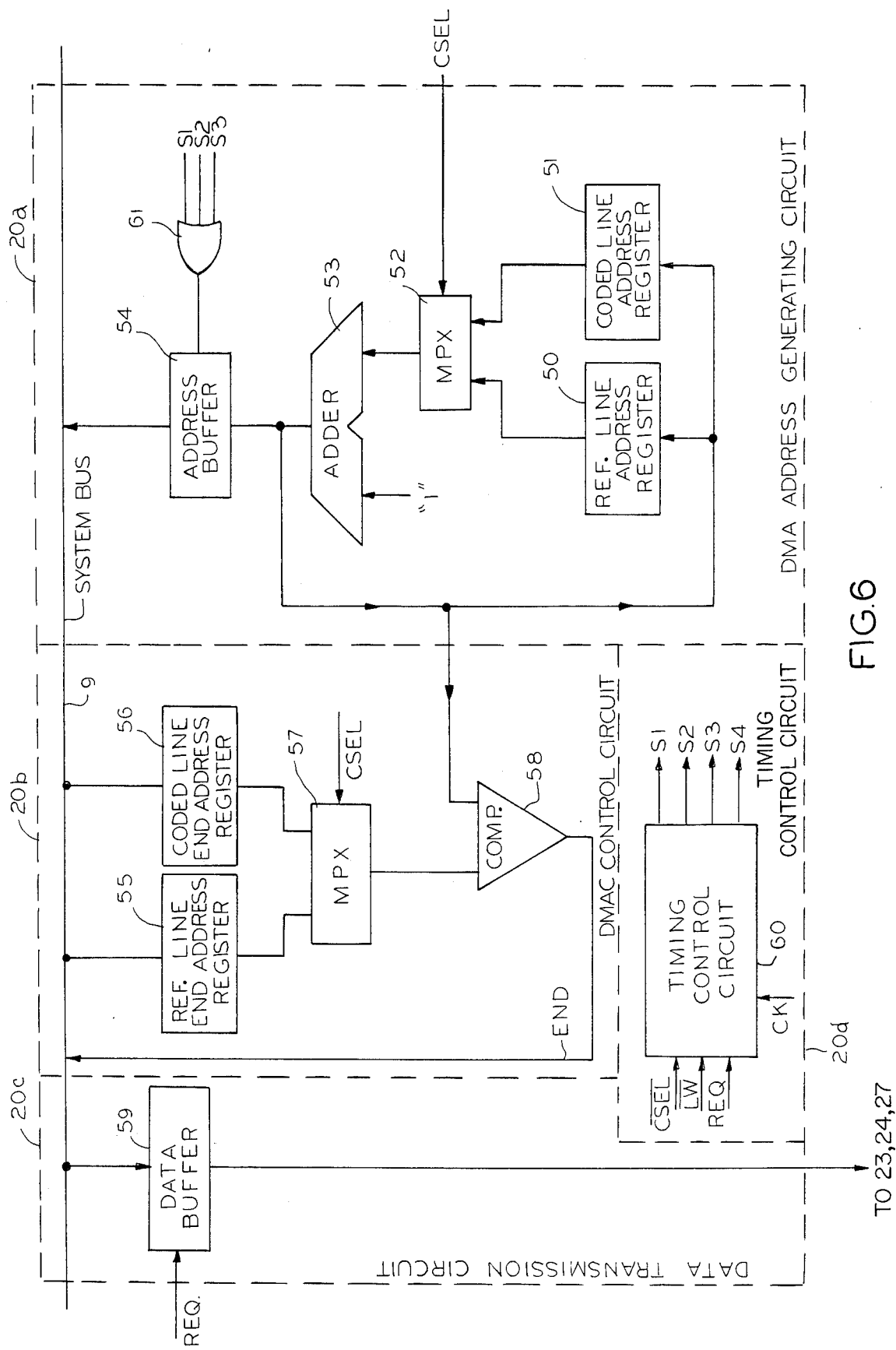
FIG. 6 illustrates an internal block diagram of a direct memory access control circuit of FIG. 3.

An internal block diagram of the DMAC 20 is illustrated in FIG. 6. The DMAC 20 comprises a DMA address generating circuit 20a having a reference line address register 50, a coded line address register 51, a multiplexer 52, an adder 53, and an address buffer 54; a control circuit 20b having a reference line end address register 55, a coded line end address register 56, a multiplexer 57 and a comparator 58; a data transmission circuit 20c having a data buffer 59; and a timing control circuit 20d having a timing control circuit 60. The DMAC 20 has to be able to read out of the image memory area 10 both the line to be coded and the line to be used as the reference line. The DMA address generating circuit 20a can generate either the coded line address or the reference line address. That is, when the CSEL input signal is "1", the coded line address is applied via the MPX 52 from the register 51 to the adder 53 and a "1" is added to it. This incremented coded line address is sent through the system bus 9 to the main memory 5 via the address buffer 54 to read the line to be coded out of the image memory area 10. It is also fed back to the register 51 to increment the register's contents. When the CSEL signal is "0", the reference address is instead applied via the MPX 52 from the reference address register 50 to the adder 53 and a "1" is added to it. This incremented reference line address is then fed back to the register 50 to increment its contents. Only when the LW signal is "1" is this incremented reference line address also sent through the system but 9 to the main memory 5 to read the reference line out of the image memory area 10. The reference line read out of the main memory 5 is transferred through the system bus 9 to the data buffer 59, which is activated when the REQ signal is "1". When the data buffer 59 is activated, the line to be coded which has been read out of the main memory 5 is entered into the coded line FIFO circuit 24 and the compression circuit 27, and the line to be used as the reference line is entered into the reference line FIFO circuit 23.

The reference line end address and the coded line end address are set by the host processor 1 in respective registers 55 and 56 and can be compared by comparator 58 with the output of the adder. When the CSEL signal is "1", the coded line end address is compared with the incremented coded line address. When the CSEL signal is "0", the reference line end address is compared with the incremented reference line address. When a coincidence signal is generated from the comparator 58, the coincidence signal is sent to the host processor 1 as a DMA end signal through the system bus 9.

Figure 7:
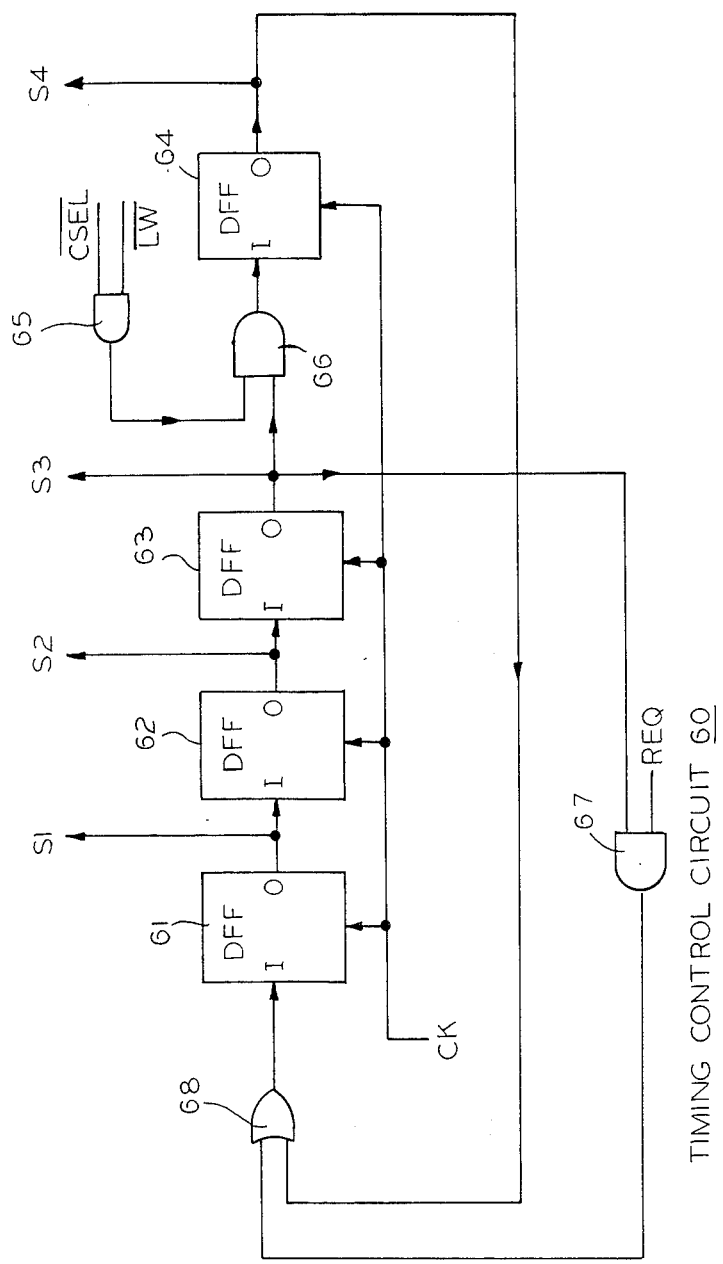
FIG. 7 illustrates a circuit diagram of a timing control circuit of FIG. 6.

The DMA transfer is controlled by timing signals S1 to S4 generated by the timing control circuit 60 in response to the $\overline{CSEL}$ signal, and $\overline{LW}$ signal (the logical inverse of the reference code LW) and the REQ signal. An internal block diagram of the timing control circuit 60 is shown in FIG. 7. The timing control circuit 60 has four delay type flip-flops (DFF) 61 to 64 which are linked together in that order and which receive a common clock signal CK. Each delay type flip-flop has an input I and an output O. An output of an OR gate 68 is applied to the input I of the DFF 61. The signal at output O of the DFF 61 is the S1 signal, which is applied to the input I of the DFF 62, whose output I is the S2 signal. The S2 signal is applied to an input I of the DFF 63. The output I of the DFF 63 is the S3 signal, which is applied to AND gates 66 and 67. The AND gate 66 also receives the output of an AND gate 65. The output of AND gate 65 is "1" when the $\overline{CSEL}$ and $\overline{LW}$ signals are both "1". The output of AND gate 67 becomes "1" when the S3 signal and the REQ signal are both "1". The last DFF 64 receives the output of the AND gate 66 at its input I and generates the S4 signal at its output O. The S4 signal and the output of the AND gate 67 are fed back to the input I of the DFF 61 via the OR gate 68.

The timing control circuit 60 shown in FIG. 7 is arranged so that the S1 signal is activated ("1") when the circuit 60 is initialized by a reset signal. Thereafter, the S2 signal follows the S1 signal by a delay of one clock pulse in response to the clock CK, and the S3 signal follows one clock pulse behind S2. The period between S1 and S3 is assigned to perform a DMA transfer. That is, either a line to be coded or a line used as a reference line is read out of the main memory 5 word by word. Therefore, the address buffer 54 of FIG. 6 is activated by either the S1, S2 or S3 signal input to OR gate 61. When a DMA transfer is required, the S1 to S3 signals are sequentially generated. After the line to be coded is transferred from the main memory 5 to the coded line FIFO circuit 24 and the compression circuit 27, the S4 signal is generated if the compression code LW read out of the line buffer 22 is "0". That is, when the compression code is "0", the expansion circuit 28 produces sixteen bits of all white signal, so that the DMA transfer of the reference line is not required. In this case, the $\overline{CSEL}$ signal and the $\overline{LW}$ signal become both "1". Thus the AND gate 66 in FIG. 7 generates a "1" signal. In response to the output of the AND gate 66, and at the next clock CK the DFF 64 produces the S4 signal. It should be noted that the expansion circuit 28 can generate the sixteen bits of white signals within the short period determined by only the S4 signal because a DMA transfer from memory is unnecessary. On the other hand, when the compression code LW read out of the line buffer 22 is "1", the expansion circuit 28 cannot produce the word of the reference line. Therefore, the REQ signal is generated to request a DMA transfer from the DMAC 20. At this time, since the AND gate 67 in FIG. 7 becomes "1", the S1 signal is next generated after the S3 signal has been generated. The S4 signal is not generated at this time after the S3 signal.

Figure 8:
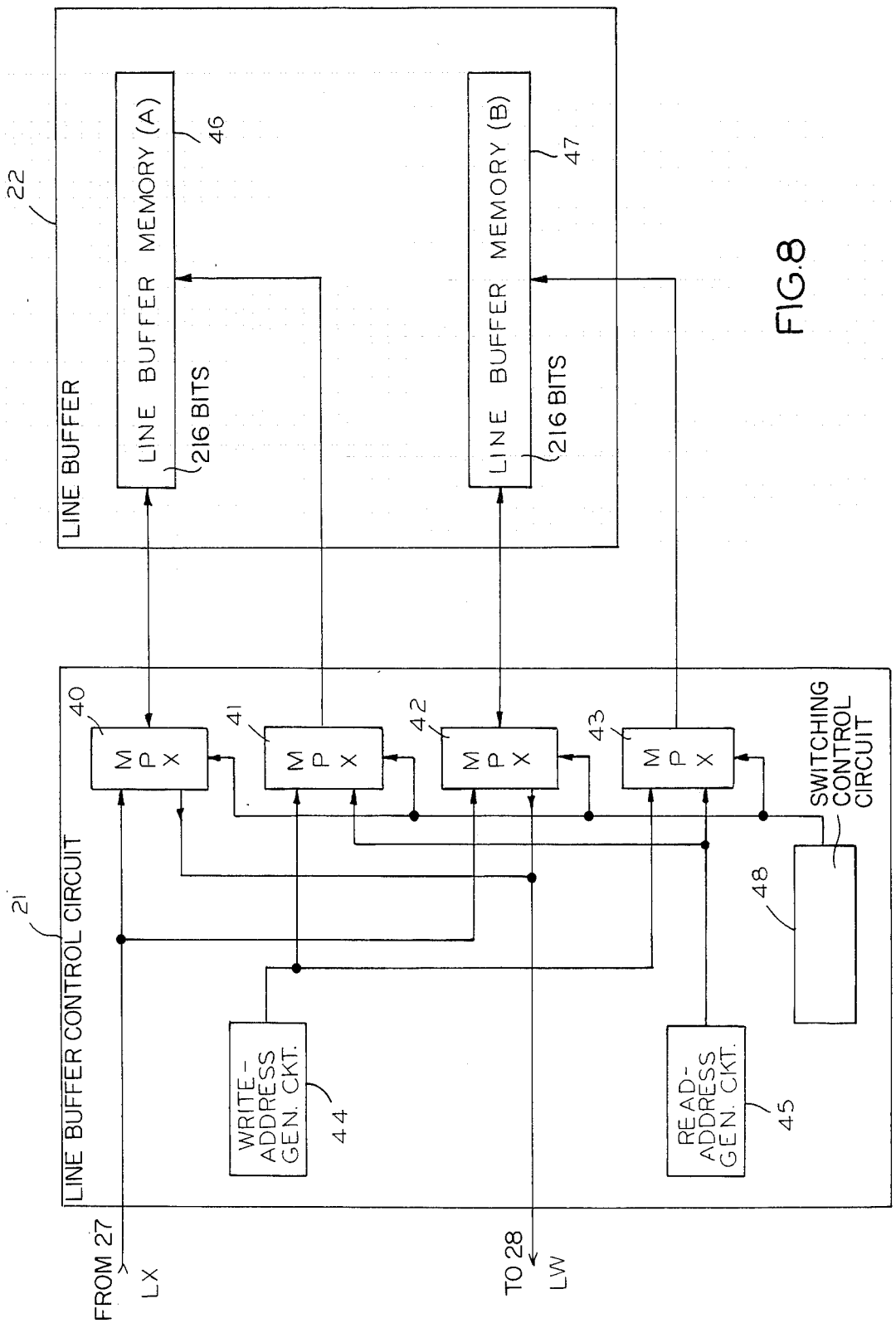
FIG. 8 illustrates internal block diagrams of a line buffer control circuit and a line buffer of FIG. 3.

FIG. 8 illustrates internal block diagrams of the line buffer control circuit 21 and the line buffer 22 in FIG. 3. The line buffer control circuit 21 has a write address generation circuit 44 and a read address generation circuit 45. The line buffer 22 has two line buffer memories, A and B (46, 47). The compression code LX applied from the compression circuit 27 is written into the line buffer memory A via a multiplexer 40 according to a write address applied to the line buffer memory A via a multiplexer 41. At this time, the compression code already stored in the line buffer memory B is read out via a multiplexer 42 as the reference code LW according to a read address applied to the line buffer memory B via a multiplexer 43. This working is reversed when a compression code is written to the memory B while a reference code is read from memory A. Multiplexers 40 to 43 are suitably controlled by a switching control circuit 48. The capacity of each line buffer memory 46, 47 need only be 216 bits.

Figure 9:
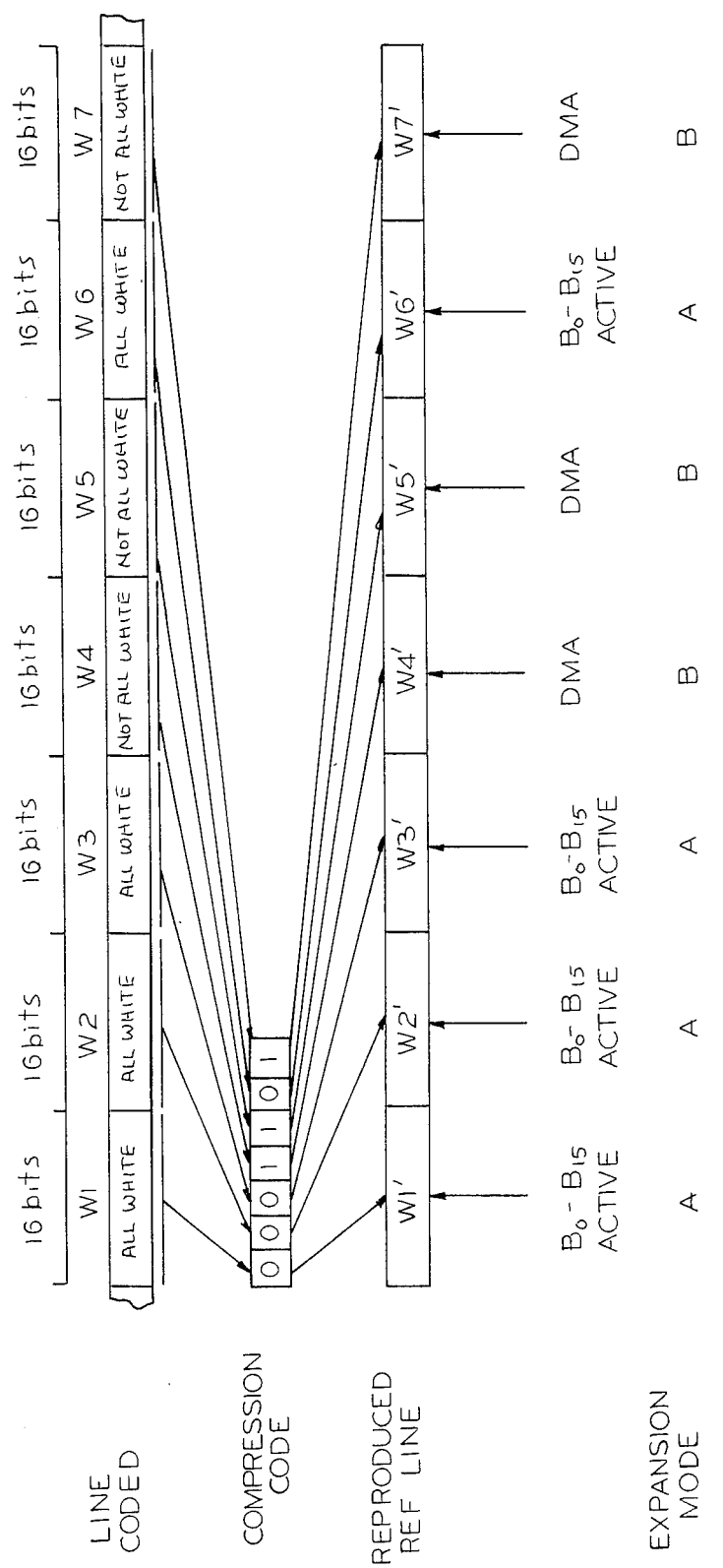
FIG. 9 shows a compression and an expansion of a reference line.

FIG. 9 shows compression of a line and its restoration by expansion of the corresponding compression codes. In FIG. 9, the 1st block to the 7th block of a line is illustrated as words W1–W7. Each word (block) consists of sixteen bits. As shown in FIG. 9, words W1, W2, W3, and W6 are all white picture elements, while words W4, W5, and W7 include at least one black picture element. Turning to FIG. 3, when word W1 is read out of the main memory 5, it is applied to both the coded line FIFO circuit 24 and the compression circuit 27. Since this word W1 has all white picture elements, the compression circuit 27 produces a compression code "0". Subsequently, the words W2 and W3 are also each compressed into the compression code "0". Words W4 and W5 are each respectively compressed into "1". The words W6 and W7 are respectively compressed into "0" and "1". Thus, the 112 bits of the line are compressed into 7 bits. When a successive line is coded, the compression codes are read out of the line buffer 22 and are used to prepare a reference line. As described above, since the words W1, W2, W3 and W6 are each compressed into a "0", the expansion circuit 28 alone can produce white picture element signals. In this case, the all "0" words W1', W2', W3', and W6' are produced by the white element generator 28a (FIG. 5) in the expansion circuit 28 and are entered into the reference line FIFO circuit 23. These operations are executed according to a mode A whose timing is shown in FIG. 10. That is, the compression code LW is read out of the line buffer 22 is response to the S1 signal and the line to be coded is read out of the main memory 5 in response to the signals S1 to S3. Because the reference code is "0", the S4 signal is generated, causing the expansion circuit 28 to produce white picture element signals W1', W2', W3', and W6' and to enter them into the reference line FIFO circuit 23.

Turning to FIG. 9, the compression codes LW of the words W4, W5 and W7 are "1", and therefore the reference line is produced by a mode B as shown in FIG. 11. According to this mode B, the compression code "1" is read out of the line buffer 22 in response to the S1 signal and the next word of the line to be coded is read out of the main memory 5 in response to signals S1 to S3. Since the compression code is "1", the timing control circuit 60 does not generate the S4 signal after the S3 signal. Instead, the signals S1 to S3 are generated to enable the DMA transfer. Then, the DMAC 20 reads the reference line information corresponding to the words W4, W5 and W7 out of the main memory 5 and enters them into the reference line FIFO circuit 23.

According to the present embodiment, the necessary capacity of the line buffer can be remarkably reduced. Therefore, the line buffer 22 can be integrated on a single semiconductor chip 200 together with the DMAC 20, the MR coding circuit 25, the FIFO circuits 23, 24 and the preparation circuit 26. Further, since the number of black picture elements is typically smaller than that of the white picture elements, MR coding can be performed at a high speed.

In FIG. 4, the compression circuit 27 compresses one block consisting of sixteen bits into one bit. However, in the case where a plurality of sixteen-bit blocks, each having all white picture elements continue in an image, the compression circuit can be modified as shown in FIG. 12. In FIG. 12, a counter 71 is inserted between the OR gate 30 and the flip-flop 31. The output of the OR gate 30 is a count-up signal which is applied via an inverter 70 to the counter 71. If the counter 71 is a 3-bit up counter, a carry signal CA is generated when eight consecutive blocks are all white picture elements. At this time, a "0" is set in the flip-flop 31, via an inverter 72. However, if at least one block includes at least one black picture element, the carry signal CA is not generated. Then, a "1" is set in the flip-flop 31. Thus, 16×8=128 bits are compressed into one bit according to FIG. 12. Therefore, the capacity of the line buffer can be further reduced.

Figure 13:
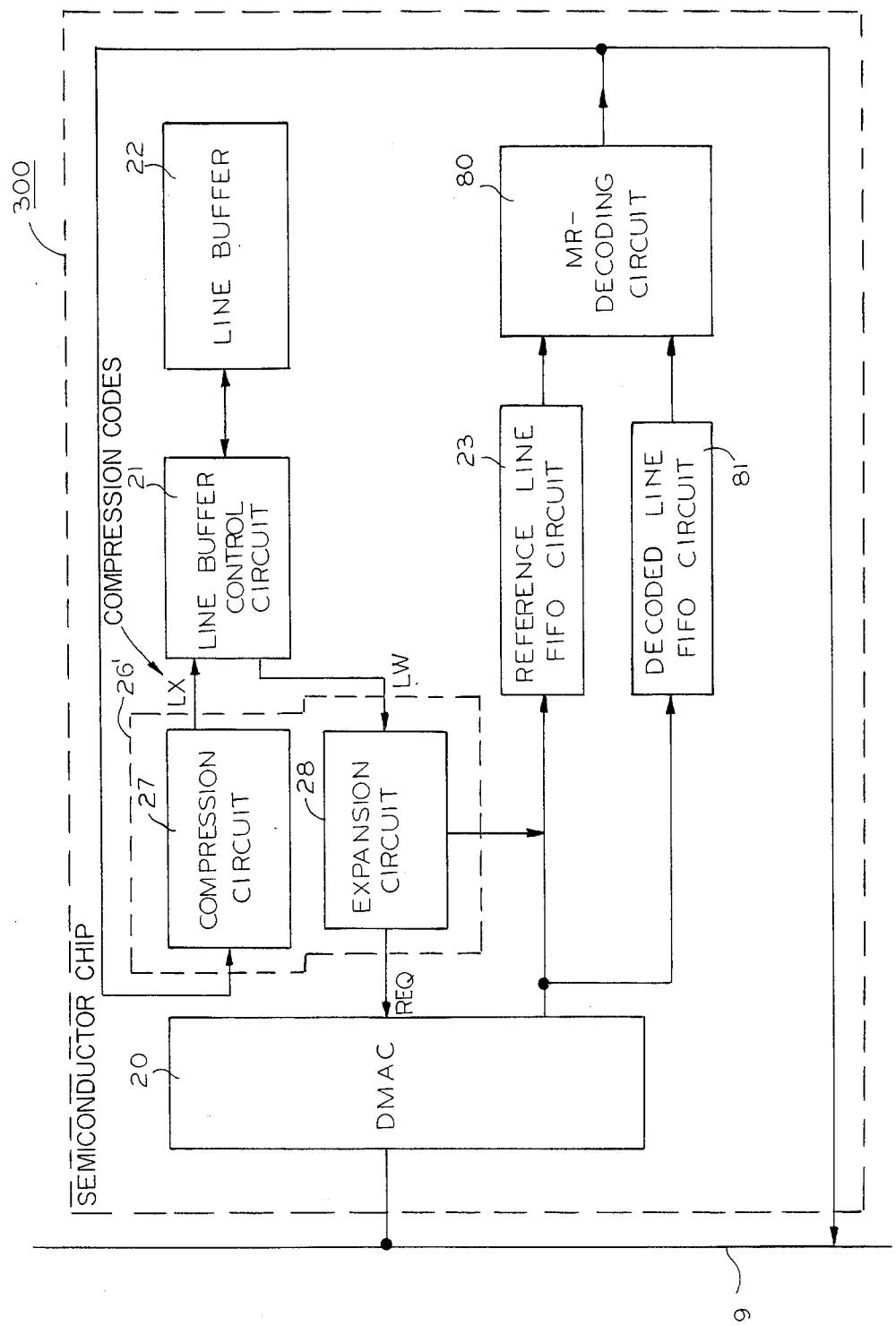
FIG. 13 illustrates an internal block diagram of a decoding circuit according to an embodiment of the present invention.

FIG. 13 illustrates another embodiment of the present invention which is applied to an MR decoding circuit. A coded signal to be decoded is received by the communication controller 7 of FIG. 1 and is stored in the main memory 5, line by line, under the control of the host processor 1. Then the stored coded signal is entered from memory 5 into the MR decoding circuit 80 of FIG. 13, by the DMAC 20, via the decoded line FIFO circuit 81. A reference line is entered into decoding circuit 80 via reference line FIFO circuit 23. The decoded line derived from the MR decoding circuit 80 is written into the image memory area 10 of the main memory 5 and is also transferred to the compression circuit 27. The compression operation is the same operation as that of the coding as shown in FIG. 4 or 12.

The decoded line is used as the reference line when the successive line is decoded. The decoded line is compressed into the compression code LX and is stored in the line buffer 22 through the line buffer control circuit 21. The compression code in the line buffer 22 is read out of the line buffer 22 as compression code LW and is applied to the expansion circuit 28. The expansion operation is the same operation as that of coding as shown in FIG. 5. As shown in FIG. 13, the preparation circuit 26' can be used to support the MR decoding operation. Thus, the line buffer 22 can be integrated on a single semiconductor chip 300 with the DMAC 20, the line buffer control circuit 21, the compression and expansion circuits 27 and 28, FIFO circuits 23 and 81, and the MR decoding circuit 80.

Further, the present invention can be applied to MMR coding/decoding.

What is claimed is:

1. A digital signal coding/decoding circuit comprising coding/decoding means responsive to an adjacent two digital signal lines for coding/decoding digital signals line by line, one of said two digital signal lines being a line which is to be coded or decoded, the other of said two digital signal lines being a reference line, first means responsive to the reference line for producing a compression code, a line buffer coupled to said first means for temporarily storing the compression code, second means coupled to said line buffer for expanding the compression code when it is read out of the line buffer to reproduce the reference line, and an interface circuit coupled to said second means and said coding/decoding means for applying said line to be coded or decoded and said reference line reproduced by said second means to said coding/decoding means.

2. A circuit as claimed in claim 1, wherein said coding/decoding means, said first and second means and said interface circuit are integrated circuits on a single semiconductor chip.

3. A circuit as claimed in claim 1, wherein said reference line has a plurality of digital signals comprising white picture elements and black picture elements, said first means producing a first code when all of a predetermined number of successive digital signals are white picture elements and producing a second code which is different from said first code when said predetermined number of successive digital signals include at least one black picture element.

4. A circuit as claimed in claim 3, wherein said second means comprises means for generating a predetermined number of digital signals representing all white picture elements when said first code is applied thereto, and means for preparing digital signals corresponding to said second code when said second code is applied thereto.

5. A digital signal coding circuit for encoding a plurality of digital signal lines stored in a memory, said circuit comprising a first circuit coupled to said memory for reading a digital signal line out of said memory, a second circuit coupled to said first circuit for compressing a plurality of successive digital signals into a first code when all of said plurality of successive digital signals are the same signal and for compressing a plurality of successive digital signals into a second code which is different from said first code when said successive digital signals include at least one signal which is different from the other signals, a third circuit coupled to said second circuit for temporarily storing said first and second codes, a fourth circuit coupled to said first circuit and to said third circuit for expanding said first code of said third circuit into the plurality of successive digital signals having the same signal and for generating a request signal according to said second code of said third circuit, said first circuit reading the digital signals corresponding to said second code out of said memory in response to said request signal, a fifth circuit coupled to said first and fourth circuits for receiving either digital signals applied from said first circuit or digital signals applied from said fourth circuit, a sixth circuit coupled to said first circuit for receiving digital signals of a digital signal line which is to be encoded, and a seventh circuit coupled to said fifth and sixth circuits for encoding the digital signals of said sixth circuit by using the digital signals of said fifth circuit.

6. A digital signal decoding circuit for decoding a plurality of encoded digital signal lines which are stored in a memory, said circuit comprising a first circuit coupled to said memory for reading an encoded digital signal line out of said memory; a second circuit for decoding the encoded digital signal line which is read out of said memory, said decoding using digital signals of a previous digital signal line which has been already decoded; a third circuit coupled to said second circuit for compressing a plurality of sequential digital signals in the previous digital signal line into a first code when all of the plurality of continuous digital signals are first signals and into a second code which is different from said first code when said plurality of sequential digital signals includes at least one second signal which is different from said first signal; a fourth circuit coupled to said third circuit for temporarily storing the first code and the second code; a fifth circuit coupled to said first circuit and to said fourth circuit for expanding said first code into a plurality of sequential digital signals all of which are said first signals and for generating a request signal in response to said second code; said first circuit reading out digital signals corresponding to said second code in the previous digital signal line out of a memory in which said previous digital signal line is stored; and a sixth circuit coupled to said first, second, and fifth circuits for applying the encoded digital signal line and either the digital signals expanded by said fifth circuit or the digital signals read out of the memory by said first circuit to said second circuit.

7. An apparatus for coding/decoding a plurality of digital signal lines, each of said lines comprising a plurality of facsimile signals, each of said facsimile signals representing either a white picture element or a black picture element, said apparatus comprising a memory for storing said plurality of digital signal lines to be coded or decoded, a dirrect memory access control circuit coupled to said memory; a coding/decoding circuit coupled to said direct memory access control circuit for coding/decoding a digital signal line with reference to a previous digital signal line which has already been coded or decoded; a line buffer for temporarily storing the information of the previous digital signal line; and a preparation circuit coupled to said direct memory access control circuit, said coding/decoding circuit and said line buffer; said preparation circuit having a compression circuit which compresses a plurality of facsimile signals of the previous digital signal line into either a first code or a second code, the first code indicating that all of a predetermined number of facsimile signals are white picture elements, the second code indicating that the predetermined number of facsimile signals include at least one black picture element, said first and second codes being stored in said line buffer; said preparation circuit further having an expansion circuit and a request signal generating circuit, said expansion circuit being enabled by said first code of said line buffer and producing a plurality of white picture element signals, said request signal generating circuit being enabled by said second code of said line buffer and generating a request signal; said direct memory access control circuit reading a plurality of facsimile signals including at least one black picture element corresponding to said second code out of said memory in response to said request signal.

8. A circuit as claimed in claim 7, wherein said direct memory access control circuit, said coding/decoding circuit, said line buffer, and said preparation circuit are integrated circuits on a single semiconductor chip.

9. A coding circuit comprising image memory means for storing signals forming scanning lines of an image; memory controller means for sequentially reading out as a current scanning line the signals of each scanning line stored in the image memory means; buffer means for storing compression codes; expansion means responsive to the compression codes stored in the buffer means for providing from the buffer means and image memory means a next previous scanning line for use as a current reference line; compression means for temporarily storing the current scanning line as compression codes in the buffer means; and coding means responsive to both the current scanning line read out from the image memory means and the current reference line provided by the expansion means for encoding the current scanning line into a corresponding transmissible line signal 10. The coding circuit of claim 9 wherein the memory controller means, the buffer means, and the coding means are integrated circuits formed on a single semiconductor chip.

11. The coding circuit of claim 9 wherein the current scanning line comprises a first preselected number of bits forming a two level black and white scanning line and the compression means produce a first compression code when a second preselected number of consecutive bits of the current scanning line are all white indicating bits and produce a second compression code when at least one of said second preselected number of consecutive bits is a black indicating bit.

12. The coding circuit of claim 9 wherein the next previous scanning line comprises a first preselected number of bits forming a two level black and white scanning line and the buffer means include means for storing a first compression code when a second preselected number of consecutive bits of the next previous scanning line are all white indicating bits and storing a second compression code when at least one of said second preselected number of consecutive bits is a black indicating bit.

13. The coding circuit of claim 12 wherein the expansion means provide the next previous scanning line by producing the second preselected number of white indicating bits when the buffer means holds the first compression code, and by reading the second preselected number of bits from the next previous scanning line stored in the image memory means when the buffer means holds the second compression code.

14. A decoding circuit comprising main memory means for storing a series of coded line signals to be decoded into a set of decoded line signals of an image; image memory means for storing the set of decoded line signals; memory controller means for sequentially reading out each coded line signal from the main memory means as a current coded line signal; buffer means for storing compression code signals; expansion means responsive to compression code signals stored in the buffer means for producing from the buffer means and image memory means a next previously decoded line signal as a current reference line signal; decoding means responsive to both the current coded line signal read out from the main memory means and the current reference line signal produced by the expansion means for decoding the current coded line signal into a corresponding current decoded line signal; and compression means for temporarily storing the current decoded line signal as a compression code signals in the buffer means, said memory controller means including writing means for storing the current decoded line signal in the image memory means.

15. The coding circuit of claim 14 wherein the memory controller means, the buffer means, and the decoding means are integrated on a single semiconductor chip.

16. A method of coding comprising the steps of storing in an image memory a set of scanning line signals of an image; sequentially reading out as a current scanning line signal each scanning line signal from the image memory; reading out a next previous scanning line signal as a current reference line signal from a buffer memory and from the image memory in response to a compression code signal in the buffer memory, and temporarily storing the current scanning line signal as a compression code signal in the buffer memory; and encoding the current scanning line signal into a corresponding transmissible line signal in response to both the current scanning line signal read out from the image memory and the current reference line signal read out from the buffer and image memories.

17. A method of decoding comprising the steps of storing in a main memory means a series of coded line signals to be decoded into a set of decoded lines of an image; storing in image memory means the set of decoded lines of an image; sequentially reading out as a current coded line signal each line signal from the main memory mean 5; reading out a next previously decoded line as a current reference line from a buffer memory and the image memory means in response to compression codes stored in the buffer memory; decoding the current coded line signal into a corresponding current decoded line in response to both the current coded line signal read out from the main memory means and the current reference line read out from the buffer memory and the image memory means; and storing the current decoded line as a compression codes in the buffer memory and storing the current decoded line in the image memory means.

* * * * *